(12) United States Patent
Gal et al.

(10) Patent No.: US 10,129,938 B2
(45) Date of Patent: Nov. 13, 2018

(54) HIGH FREQUENCY CURRENT DRIVER SYSTEM

(71) Applicant: 8952272 CANADA INC., Saint-Bruno-de-Montarville (CA)

(72) Inventors: George Gal, Saint-Bruno-de-Montarville (CA); Alex Gal, Saint-Bruno-de-Montarville (CA); Mircea Gal, Saint-Bruno-de-Montarville (CA)

(73) Assignee: 8952272 CANADA INC., Saint-Bruno-de-Montarville (CA)

( * ) Notice: Subject to any disclaimer, the term of this patent is extended or adjusted under 35 U.S.C. 154(b) by 0 days.

(21) Appl. No.: 15/700,984

(22) Filed: Sep. 11, 2017

(65) Prior Publication Data

US 2018/0077764 A1 Mar. 15, 2018

Related U.S. Application Data

(60) Provisional application No. 62/393,207, filed on Sep. 12, 2016.

(51) Int. Cl.
| | |
|---|---|
| G05F 1/00 | (2006.01) |
| H05B 37/02 | (2006.01) |
| H05B 33/08 | (2006.01) |
| G03B 15/05 | (2006.01) |

(52) U.S. Cl.
CPC ......... *H05B 33/0809* (2013.01); *G03B 15/05* (2013.01)

(58) Field of Classification Search
CPC ........................... H05B 33/0809; G03B 15/05
USPC ........................................................ 315/294
See application file for complete search history.

(56) References Cited

U.S. PATENT DOCUMENTS

| | | | |
|---|---|---|---|
| 5,990,631 A | 11/1999 | Hioki et al. | |
| 6,104,144 A | 8/2000 | Yoneya et al. | |
| 7,949,247 B2 | 5/2011 | Kita | |
| 8,711,462 B1 | 4/2014 | Kaiser et al. | |
| 2013/0264961 A1* | 10/2013 | Chang | H04B 1/48 |
| | | | 315/201 |
| 2014/0176008 A1* | 6/2014 | Harish Gopala Pillai | ................. |
| | | | H05B 33/0809 |
| | | | 315/291 |

* cited by examiner

*Primary Examiner* — Daniel D Chang
(74) *Attorney, Agent, or Firm* — Leason Ellis LLP (57) ABSTRACT

A system for driving one or more electrical currents includes a current driver operable to cause current to flow to the one or more driven electrical elements, a sensor module for sensing a current at the input of the current driver, a compensation module for compensating an input control signal based on the sensed current at the input of the current driver and an optocoupling module having a grounded side connected to an earth ground and a floating side connected to a floating ground. The grounded side receives the compensated control signal and the floating side outputs a floating control signal corresponding to the compensated control signal. An amplification module connected to the floating ground is operable for amplifying the floating control signal outputted from the optocoupling module. The amplified floating control signal further controls the current driver to cause the flow of current to the driven electrical elements.

20 Claims, 8 Drawing Sheets

HIGH FREQUENCY CURRENT DRIVER SYSTEM

RELATED PATENT APPLICATION

The present application claims priority from U.S. provisional patent application No. 62/393,207, filed Sep. 12, 2016 and entitled "HIGH FREQUENCY CURRENT DRIVER SYSTEM", the disclosure of which is hereby incorporated by reference in its entirety.

TECHNICAL FIELD

The technical field generally relates to a current driver system and more particularly to a system that may be used to drive light emitting devices at a high frequency and high intensity while preserving a nearly ideal rectangular optical output shape, such as within a stroboscopic lighting apparatus.

BACKGROUND

Various applications require electrical elements to be driven at high voltage and/or high current. Such elements may further need to be driven at a high frequency. One such application is a stroboscopic lighting apparatus, in which light emitting devices must be driven at high frequency and high intensity. The apparatus has various applications, including use for visual inspection during manufacturing.

Such applications require high performance and high precision.

SUMMARY

According to one aspect of the present invention, there is provided a system for driving one or more electrical elements. The system includes a current driver operable to cause current to flow to the one or more driven electrical elements, a sensor module for sensing a current at the input of the current driver, a compensation module for compensating an input control signal based on the sensed current at the input of the current driver, an optocoupling module having a grounded side connected to an earth ground and a floating side connected to a floating ground, the grounded side receiving the compensated control signal and the floating side outputting a floating control signal corresponding to the compensated control signal, and an amplification module connected to the floating ground and operable for amplifying the floating control signal outputted from the optocoupling module, the amplified floating control signal further controlling the current driver to cause the flow of current to the driven electrical elements.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Portions of various elements and modules described herein may be implemented using discrete electrical components, integrated circuits, or a combination thereof. Some elements and modules are described by their operation and/or function and may be provided in a prepackaged form, such as prepackaged IC components.

The term "connected" or "connecting" as used herein can have an electrical connotation. The term connected or connecting can indicate that two elements or devices are directly connected to one another or connected one another through one or more intermediate elements or devices via an electrical element or electrical signal.

Figure 1:
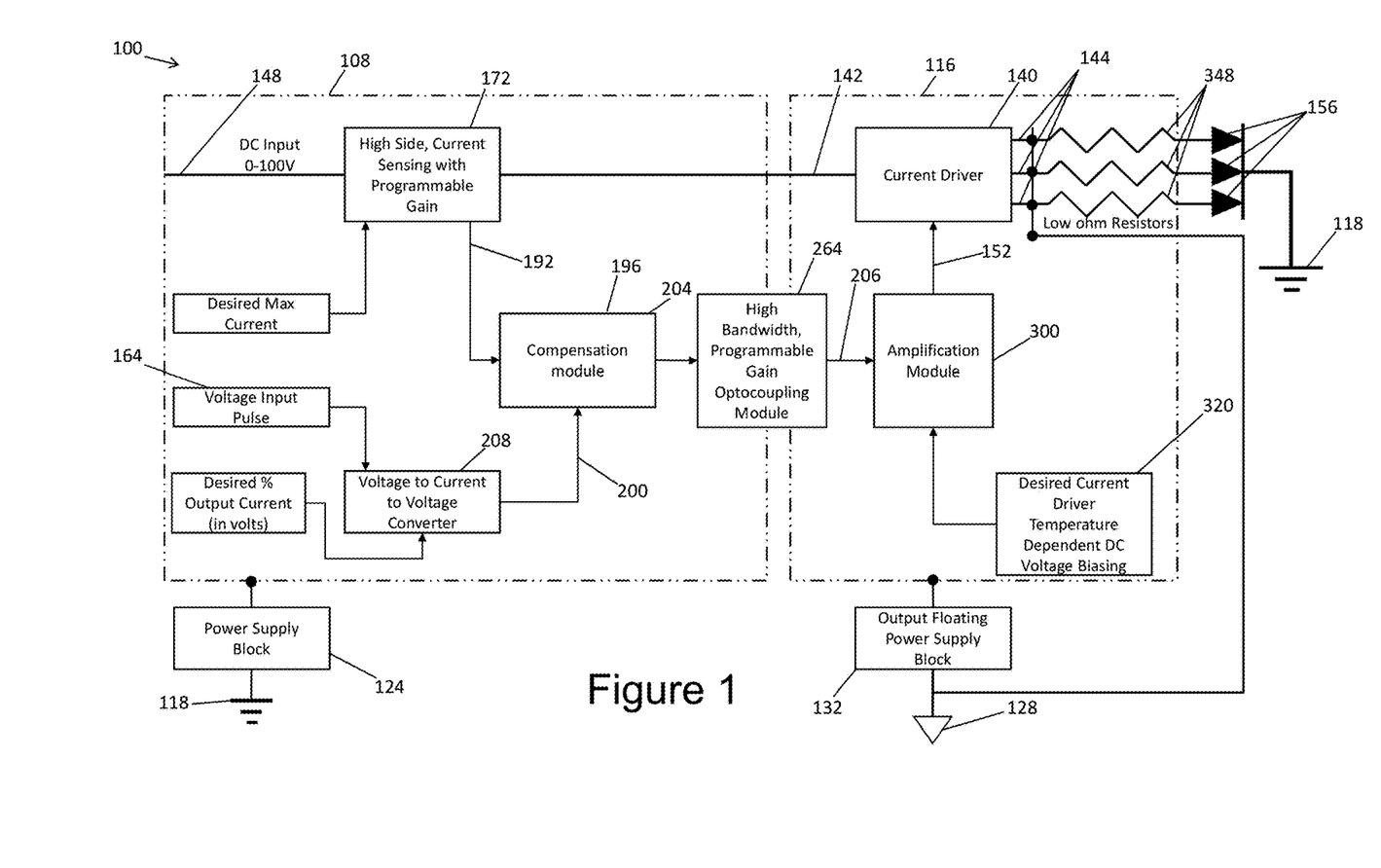
FIG. 1 illustrates a schematic diagram of operational modules of a current driver system according to one example embodiment.

Referring now to FIG. 1, therein illustrated is a schematic diagram of the operational modules of a current driver system 100 according to one example embodiment. The current driver system 100 may be generally divided into a grounded subsystem 108 and a floating subsystem 116.

The grounded subsystem 108 is formed of elements and/or components that are connected to a chassis ground or an earth ground 118, which is generally 0V, referred herein after as "earth ground". It will be understood that one or more elements, such as capacitors/resistors may be connected on the path to earth ground to reduce parasitics.

Elements of the grounded subsystem 108 are powered by a low-voltage power supply 124 that is also connected to the earth ground 118. For example, the low-voltage power supply 124 has an output voltage of about equal to or less than 24 V. In some examples, the output voltage of the low-voltage power supply may be about equal to or less than 5V.

The floating subsystem 116 is formed of elements and/or components that are each connected on their low voltage side to reference voltage, which is hereinafter referred to as a floating ground 128. The floating ground 128 is defined by the voltage at the anode of electrical elements driven by the current driver system 100, as further defined herein.

When the electrical elements are driven by current, the floating ground 128 may correspond to the voltage difference required to drive the electrical elements. For example, where the driven electrical elements are light emitting diodes (LEDs), the floating ground 128 may have a voltage value required to drive the LEDs (ex: about 5V or less for low-voltage LEDs, greater than 36V for high-voltage LEDs).

A DC-DC voltage converter 132 has an output side connected to the floating ground 128 and acts as a power supply for elements and/or components of the floating subsystem 116. A voltage regulator may be further connected to the output of the DC-DC voltage converter 132.

The current driver system 100 includes a current driver module 140 within its high-voltage floating subsystem 116. The current driver module 140 is operable to cause current to flow from an input 142 of the module 140 to an output 144 of the module 140 to drive one or more driven elements connected to the output 144. An input of the current driver module 140 is connected to a high voltage power supply 148 from which the current driver module 140 is operable to draw current. In one example, the high voltage power supply 148 may have a maximum output voltage of about 100V. However, higher voltages may be supplied to the current driver system 100 (which may require a sensor module 172 capable of sustaining higher voltages, such as using an AMC1301 from Texas Instruments™). The high voltage power supply 148 may be a DC voltage source.

According to various example embodiments, the elements being driven are light emitting devices, such as light emitting diodes (LEDs).

Figure 2:
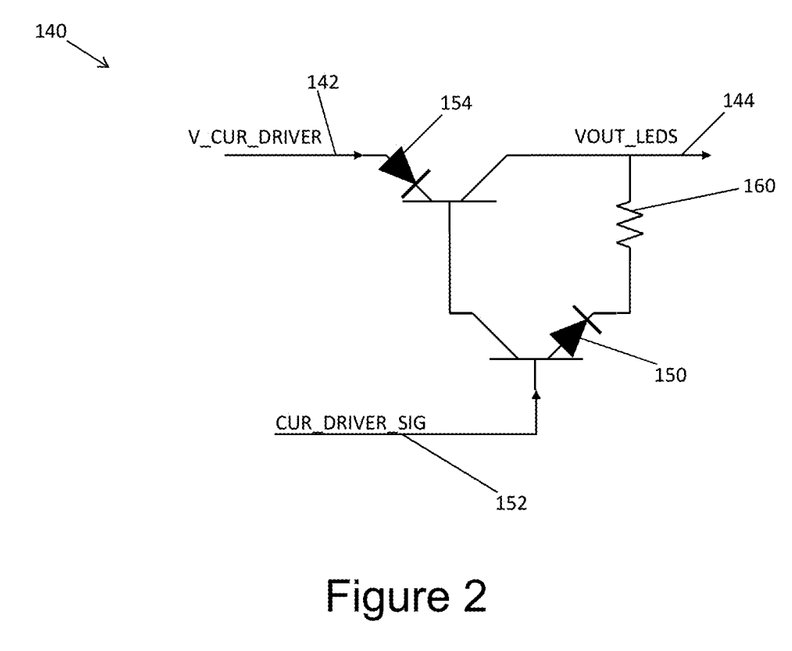
FIG. 2 illustrates a schematic circuit diagram of a current driver module according to one example embodiment.

Referring now to FIG. 2, therein illustrated is a schematic circuit diagram of the current driver module 140 according to one example embodiment. As illustrated, the example current driver module 140 includes a first transistor 150 which receives a driver control signal 152. The first transistor 150 is connected to a second transistor 154 that defines the input 142 and output 144 of the current driver module 140. The first transistor 150 drives the second transistor 154 to cause flow of current from the input 142 to the output 144. A small resistor 160 (on the order $10^{-1}$ to $10^2 \Omega$) may be added in series in order to reduce or prevent oscillations.

It will be understood that while the example illustrated in FIG. 2 uses an NPN transistor as the first transistor 150 and a PNP transistor as the second transistor 154, other combination of transistors may be used. In one alternative embodiment, a NPN transistor may be used as the second transistor 154, which may be able to cause more flow of current for the same biasing input within the driver control signal 152, which also increases the 3 dB bandwidth of the current driver module 140.

In yet other alternative embodiment, NMOS transistors may be used for the first transistor 150 and/or the second transistor 154, which can provide for wider current capability and better temperature characteristics.

The flow of current through the driver current module 140 is controlled as a function of an input control signal 164. The input control signal 164 may be provided by an external system that operates in conjunction with the current driver system 100. The input control signal 164 may be a pulsed signal that includes a plurality of pulses so as to cause the flow of current through the driver current module 140 to have a corresponding series of pulses (ex: same frequency). The input control signal 164 may be a digital voltage signal.

Referring back to FIG. 1, the current driver system 100 further includes a sensor module 172. The sensor module 172 is operable to sense the level of current flowing within the current driver 140. According to one example embodiment, and as illustrated, the sensor module 172 is implemented within the low-voltage subsystem 108. The sensor module 172 may have programmable gain.

Figure 3:
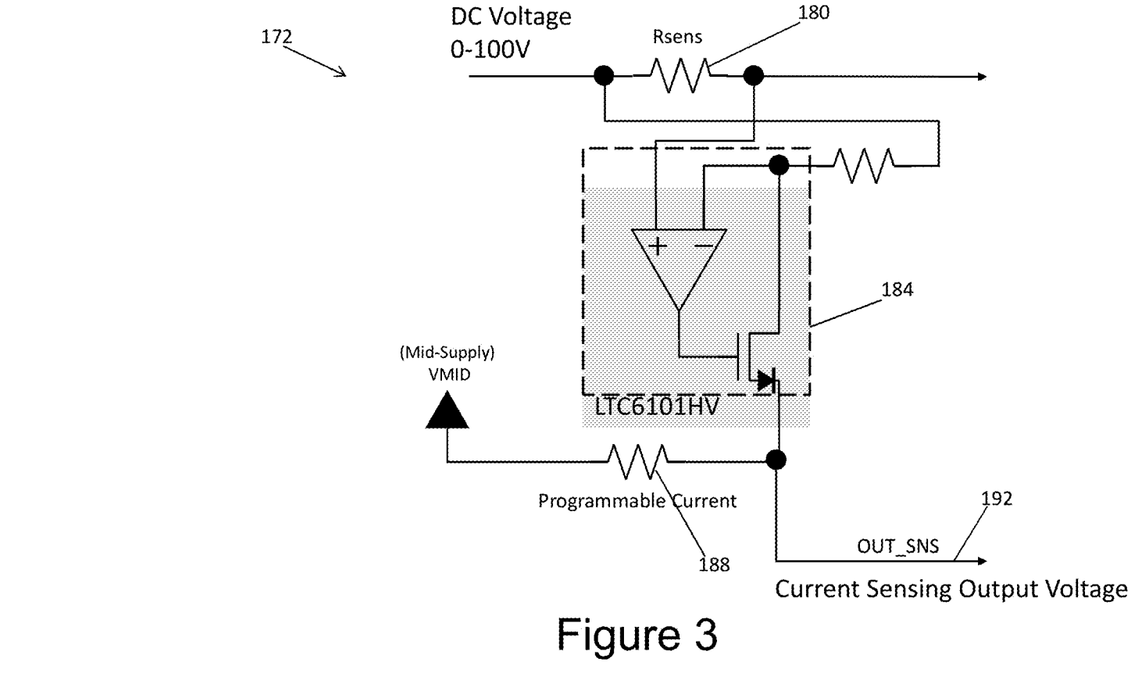
FIG. 3 illustrates a schematic circuit diagram of a sensor module according to one example embodiment.

Referring now to FIG. 3, therein illustrated is a schematic circuit diagram of the sensor module 172 according to one example embodiment. The sensor module 172 includes a sensing resistor 180 that is connected in series with the input 142 of the current driver module 140. Accordingly, the current flowing through the sensing resistor 180 corresponds to the current flowing through the current driver module 140. The sensing resistor 180 is chosen to have a low resistance (ex: about 20 mΩ) to measure a high current at the expense of ignoring low current values. Each node of the sensing resistor 180 is connected to a current sensing submodule 184. In one example embodiment, the current sensing submodule 184 is implementing using a current sense amplifier, such as the LTC6101HV from Linear Technology™. It will be understood that other current sensing modules may be used as long as they support DC input voltage. An example would be using the AMC1301 by Texas Instruments™ as power supply 148, which would increase the DC input voltage at the input of the sensor module 172 past 100V.

The output current of the current sensing submodule 172 is converted to voltage using a programmable resistor 188 so as to output a sensed current signal 192. The programmable resistor 188 may further be used to select a maximum output current of the current driving system 100. This represents a first user-controllable setting of the current driver system 100. Resistor 188 maps the current outputted from the current sensing submodule 184 into a voltage value that is a function of the resistance of the programmable resistor 188. The overall negative feedback closed loop behavior of system 100 will make voltage 192 track the voltage reference 200 at the input of the compensation module 196. Various modules of the system 100 are appropriately configured so as to avoid oversaturation.

Referring back to FIG. 1, the current driver system 100 further includes a compensation module 196 which is implemented within the low-voltage subsystem 108. The compensation module 196 receives the sensed current signal 192 and a pre-compensated control signal 200. The pre-compensated control signal 200 is representative of the input control signal 164. The compensation module 196 is operable to compensate the pre-compensated control signal 200 based on the received sensed current signal 192. The compensating is carried out to reduce/minimize errors between sensed current signal 192 and the pre-compensated control signal 200. A compensated control signal 204 is outputted from the compensation module 196. In one example embodiment, the compensating module 196 may include an error amplifier for compensating errors between the sensed current signal 192 and the pre-compensated control signal 200. The compensating module 196 may further include a filtering submodule for filtering the control signal 200 after compensating. The compensation module 196 is configured to be a medium bandwidth module.

Continuing with FIG. 1, according to one example embodiment, the current driver system 100 includes a voltage to current to voltage converter 208 that is operable for converting the input control signal 164 that is initially provided as a control voltage signal to a control current signal that is further converted back to voltage. The control voltage signal corresponds to the pre-compensated control signal 200 received at the compensation module 196. Converting the input control signal 164 to current signal within the voltage to current to voltage converter 208 allows for higher bandwidth operation.

Figure 4:
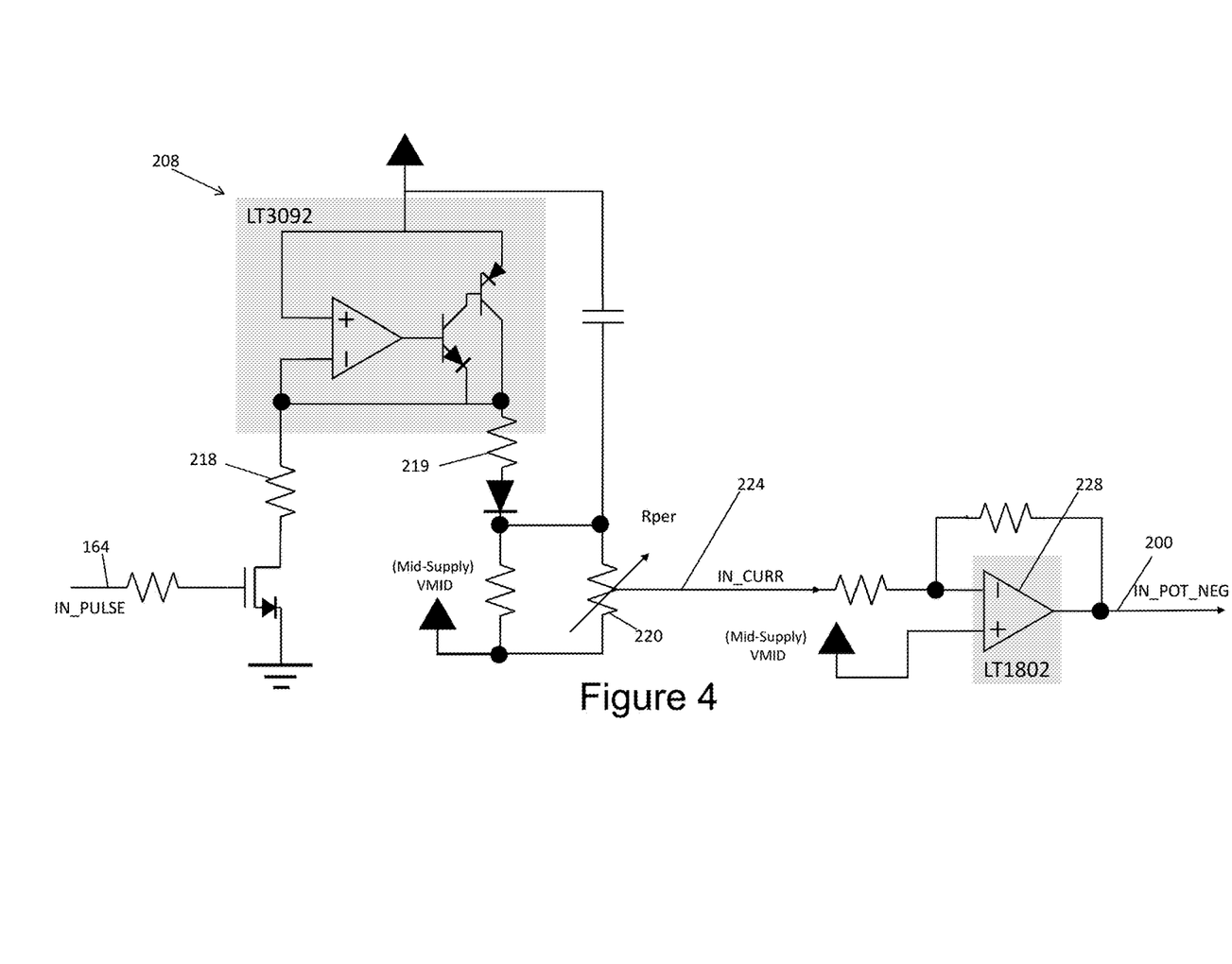
FIG. 4 illustrates a schematic circuit diagram of a voltage to current converter according to one example embodiment.

Referring now to FIG. 4, therein illustrated is a schematic circuit diagram of the voltage to current to voltage converter 208 according to one example embodiment. The voltage to current to voltage converter 208 includes a current source 216 which outputs a current signal that corresponds to the input control signal 164. For example, where the input control signal 164 is a pulsed signal having pulses of a given duration, the current signal also has pulses of the given duration. The input control signal 164 may be a digital voltage signal. The output current of current source 216 is determined by means of external resistors 218, 219. As illustrated, the current source 216 may be implemented using the LT3092 current source from Linear Technology™. An output of the current source 216 is connected to a variable resistor 220 to set the overall desired output percentage level of current outputted at output 144 of the current driver module 140 with respect to overall maximum current set at sensed current signal 192.

Continuing with FIG. 4, the output voltage 224 may be inverted and amplified using an operational amplifier 228 prior to being outputted as the pre-compensated voltage control signal 200.

The current source 216 is used to limit parasitic effects of the variable resistor 220. In an alternative embodiment, another current source having a current mirror may be used.

In yet another alternative embodiment, a digital resistor having lower parasitic may be used and incorporated directly into the feedback of the operational amplifier 228.

Figure 5:
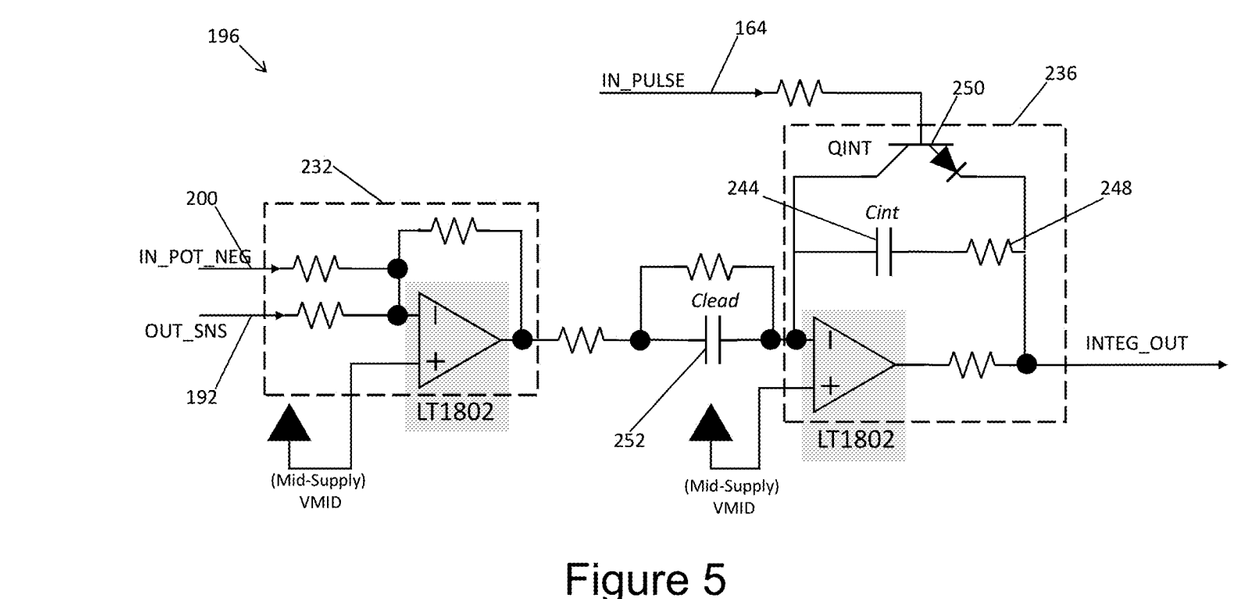
FIG. 5 illustrates a schematic circuit diagram of the compensation module according to one example embodiment.

Referring now to FIG. 5, therein illustrated is a schematic circuit diagram of the compensation module 196 according to one example embodiment for use in conjunction with the voltage to current to voltage converter 208. The compensation module 196 includes an error amplifier 232 that receives as its inputs the sensed current signal 192 and the pre-compensated signal 200 received from the voltage to current to voltage converter 208.

The compensation module 196 further includes a non-ideal integrator 236 that includes a first capacitor 244 in series with a resistor 248. The capacitor operates to provide compensating circuit current slope through under-damped, damped and over-damped regions. A transistor 250 may be connected to the input control signal 164. Where the input control signal 164 is a pulsed signal, the transistor 250 resets the integrator 236 when each pulse is over.

The compensation module 196 may further include a second capacitor 252 connected in between the error amplifier 232 and the non-ideal integrator 236. The two capacitors 244 and 252 also compensate any response caused by additional layout parasitic effects.

According to one alternative embodiment, an NMOS transistor may be used instead of the illustrated NPN transistor 250.

A higher bandwidth op-amp may be used instead of the LT1802 op-amp illustrated in FIG. 5. The LT1802 is a CMOS based operational amplifier with low input current offset and voltage, while having rail-to-rail operational capabilities. For example, a FET-based operational amplifier will provide increased current offset, which may influence the choice of resistors and capacitors within the compensation module 196.

Referring back to FIG. 1, the current driver system 100 further includes an analog optocoupling module 264. The analog optocoupling module 264 receives at its input the compensated control signal 204 and outputs a floating control signal 206 that corresponds to the compensated control signal 206. The signal path between the inputted compensated control signal 204 and the floating control signal 206 is provided in part by analog photoelectric components within the analog optocoupling module 264. The optocoupling module 264 provides transmission of the compensated control signal 204 between the grounded subsystem 108 and the floating subsystem 116 while also electrically decoupling the grounded subsystem 108 from the floating subsystem 116. Accordingly, the optocoupling module 264 provides a non-electrical interface between the grounded subsystem 108 and the floating subsystem 116. An input side of the optocoupling module 264 corresponds to a grounded side thereof and is connected to earth ground 118. An output side of the optocoupling module 264 corresponds to a floating side thereof and is connected to the floating ground 128.

Figure 6:
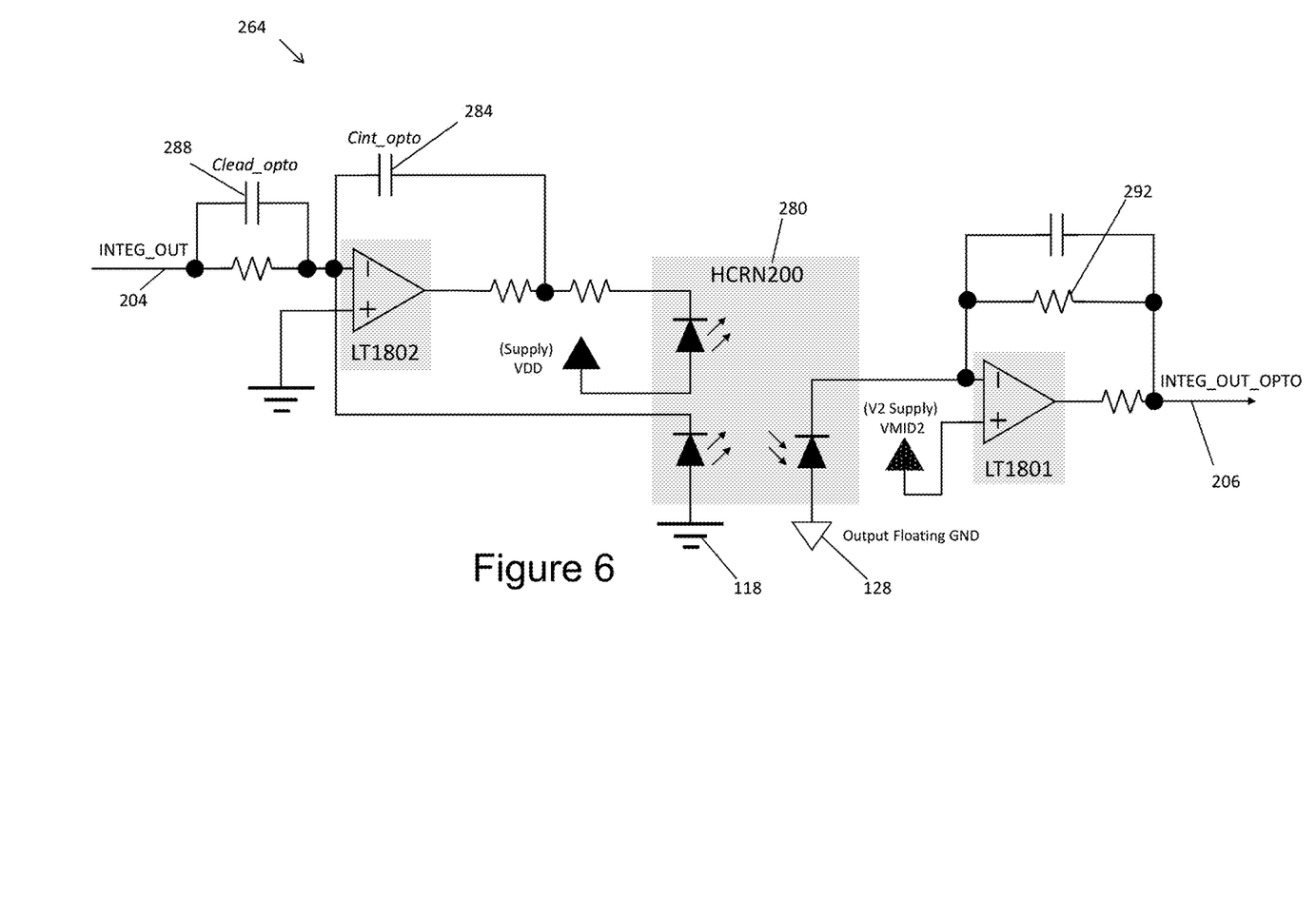
FIG. 6 illustrates a schematic circuit diagram of an optocoupling module according to one example embodiment.

Referring now to FIG. 6, therein illustrated is a schematic circuit diagram of the optocoupling module 264 according to one example embodiment. The optocoupling module 264 includes an optocoupler 280 which provides the photoelectric coupling while also providing electrical decoupling. As illustrated, an input diode of the optocoupler 280 is connected to earth ground 118 while an output diode of the optocoupler 280 is connected to floating ground 128. The optocoupler 280 may include one or more AlGaAs LEDs that provide the photoelectric coupling. The optocoupler 280 preferably has high linearity and high 3-db open-loop bandwidth. For example, the optocoupler 280 may be a HCRN200 optocoupler from Avago Technologies™. The HCNR200 module corresponds to a linearized feedback diodes optocoupled modules that provides a non-linearity as low as 0.25% and as much as 0.01%, while having a 3-db open-loop bandwidth of 9 MHz.

It was observed that the analog optocoupler 280 introduces a delay into the optocoupling module 264. To compensate for this delay, delay elements in the form of feedback capacitors 284 and 288 are connected on the input side of the optocoupler 280. Capacitors 244 and 252 of the compensation module 196 also contribute to compensating for delays introduced in the analog optocoupler 280.

On the output side of the analog optocoupler 280, an operational amplifier with feedback resistor 292 transforms the current outputted from the output diode of the optocoupler 280 to an output voltage signal corresponding to the floating voltage control signal 206. The feedback resistor may be altered to adjust the gain provided. The positive input of the operational amplifier is connected to a second voltage supply (Vmid2) which is used to DC bias the output diode of the analog optocoupler 280.

Referring back to FIG. 1, the current driver system 100 further includes an amplification module 300 that is operable for amplifying the floating voltage control signal 206 outputted from the optocoupling module 264. The floating voltage control signal 206 amplified by the amplification module 300 is outputted from the amplification module 300 as amplified floating voltage control signal 152 that controls the current driver module 140 for causing flow of current. As the amplification module 300 is implemented within the floating subsystem 116, it is connected to the floating ground 128 of the current driver system 100, hence making its output becoming higher voltage than the voltage within the grounded subsystem 108.

Figure 7:
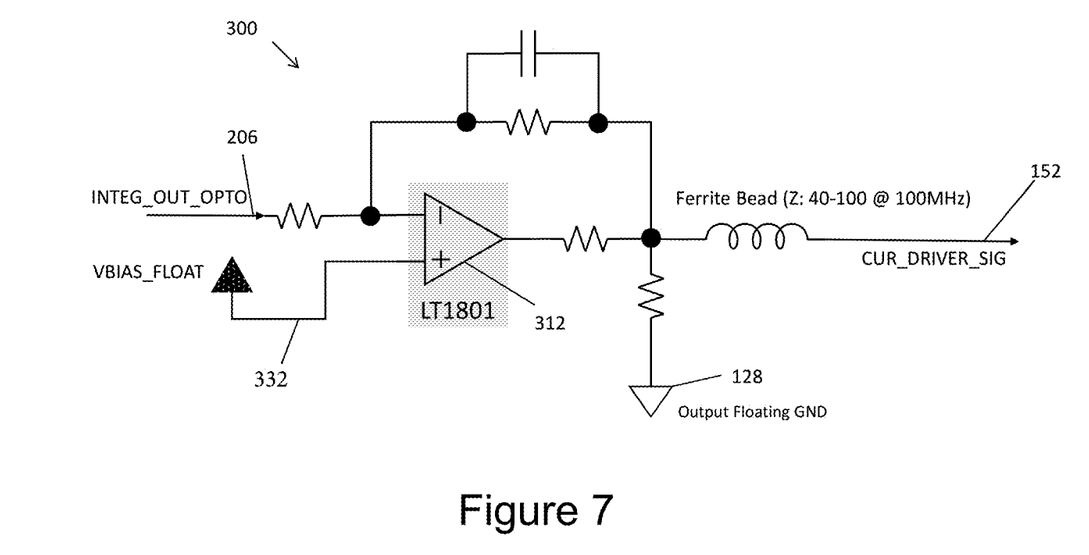
FIG. 7 illustrates a schematic circuit diagram of an amplification module according to one example embodiment.

Referring now to FIG. 7, therein illustrated is a schematic circuit diagram of an amplification module 300 according to one example embodiment. The amplification module 300 includes an operational amplifier 312 that has a first input receiving the floating control signal 206 and a second input connected to the floating side voltage source 132. As described elsewhere herein, the floating side voltage source 132 may be DC biased, in which case the second input may be connected to DC biasing point 332, as illustrated in FIG. 7. The operational amplifier 312 is connected on its output side to the floating ground 128. A noise-suppression element is also provided at the output of the operational amplifier 312. This element suppresses high frequency noise on the high gain input gate of the current driver module 140. In the illustrated example, the noise-suppression element is a ferrite bead having at least 40 ohm impedance may be used.

Referring back to FIG. 1, the current driver system 100 may optionally include a temperature-sensitive DC voltage biasing module 320. It was observed that as the temperature in the current driver system 100 rises, there is a small amount of current that flows into the base (for a BJT transistor) of the first transistor 150 of the current driver module 140 if the same DC biasing voltage is applied within the floating subsystem 116. The temperature-sensitive DC voltage biasing module 320 is operable to adjust the DC biasing voltage within the floating subsystem 116 based on changes in temperature to restrict or prevent this flow of the small amount of current into the base or gate.

Figure 8:
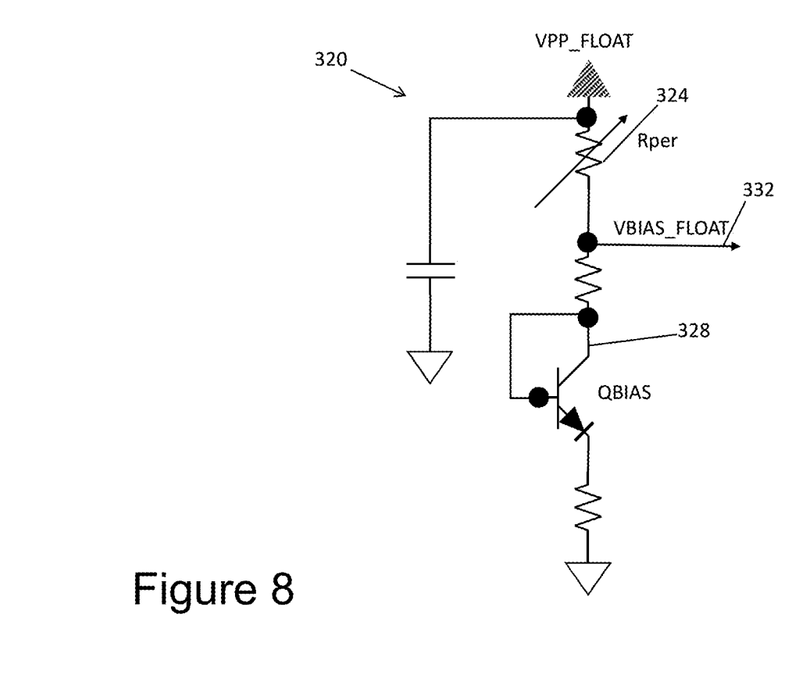
FIG. 8 illustrates a schematic circuit diagram of the temperature-sensitive DC voltage biasing module according to one example embodiment.

Referring now to FIG. 8, therein illustrated is a schematic circuit diagram of the temperature-sensitive DC voltage biasing module 320 according to one example embodiment. The biasing module 320 includes a variable resistor 324 and at least one transistor 328 connected in series. The variable resistor 324 allows for tuning of the DC biasing point 332 (i.e. the outputted biased DC voltage), which represents a third user-controllable setting. The transistor 328 is selected to be the same as the first transistor 150 of the current driver module 140. As temperature rises, current flow in the transistor 328 changes the voltage of the DC biasing point 332. The value of the variable resistor 324 is chosen to match the behavior of the first transistor 150 and the transistor 328 as closely as possible. More than one transistor 328 connected in parallel may be used to allow greater current flow. Alternatively, a diode allowing flow of high current may be used.

Referring back to FIG. 7, the biased DC voltage 328 is connected to one of the inputs of the operational amplifier 312 of the amplification module 300 within the floating subsystem 116. Accordingly, the operation of the amplification module 300 and the amplified floating control signal 152 are both temperature sensitive.

According to one example embodiment, the current driver system 100 is used for driving one or more LEDs 156. As illustrated in FIG. 1, the output 144 of the current driver module 140 is connected to an anode of the LEDs 156, which defines the floating ground 128. The cathode of the LEDs is connected to earth ground 118. Where the floating ground 128 is high voltage, the LEDs are high-voltage LEDs. However low voltage LEDs may also be used. The LEDs are turned on when current flows through the current driver module 140.

As illustrated, a plurality of LEDs 156 are connected in parallel from the output 144 of the current driver module 140. Low-resistance flame-proof resistors are connected at the output 144 to compensate for any non-idealities between the LEDs. Furthermore, the LEDs may be chosen from the same bin number so as to have similar characteristics.

In one example application, the current driver system 100 and the LEDs 156 are implemented within a stroboscopic lighting apparatus, which may be use for inspection, such as using machine vision. The current driver module 140 is controlled by a high-frequency pulsed control signal 164 so as to drive the LEDs 156 to strobe at the high frequency. By driving the LEDs 156 in parallel, a larger number of LEDs 156 may be used within the stroboscopic lighting apparatus. Moreover a larger number of LEDs 156 may be driven per current driver system 100. Use of larger number of LEDS 156 allows for more optical output power from the stroboscopic lighting apparatus while requiring a fewer number of current driver systems 100. For example, the LEDs may be driven with a pulsed signal having a frequency of up to 50 kHz while maintaining performance of the current driver system 100.

In another example application, the current driver system 100 and the LEDs 156 are used in a camera apparatus. The camera apparatus may be used for emitting light for a short duration corresponding to capture of an image. Accordingly, the current driver module 140 is controlled by a shorter duration pulse.

In one example implementation, each current driver system 100 is operable to drive six LEDs in parallel for a total current of approximately 40 Amps at approximately 70 Volts for a maximum duration of about 100 µs. The duration of the pulse can be varied by varying the input duration control signal 164. However, it will be understood that other LEDs may be used. UV LED curing may also be beneficial. The circuitry of the current driver system 100 may be optimized for cost and performance. The circuitry may also be optimized for PCB printing. In one implementation, a two-layer stack up is used in which the layout was chosen to minimize coupling between traces and to minimize coupling between high voltage signals and low voltage signals. However, it will be understood that other number of stacks may be used.

Various example embodiments described herein provide high voltage side switching from the current driver module 140. That is, the current is regulated at the output of external DC source that drives the elements being driven (ex: LEDs). It was observed that this compensates any parasitic on the return path of multiple parallel loads (ex: layout, inductance from wiring). As described, the use of the optocoupler within the optocoupling module 264 decouples the grounded subsystem 108 from the floating subsystem 116 while also preserving the high bandwidth of the compensation loop between both sides. In some examples, the current driving system is non-linear over the full current controlled range.

It was further observed that the current driver system 100 generates an output signal 144 having a high rise time for driving electrical elements. The rise time may be controlled by the DC voltage biasing module 320. Where the input control signal 164 is a rectangular pulse signal, the optical output from LEDs being driven also has a highly rectangular waveform. This is the case for both smaller and larger LEDs as well as low-voltage (ex: 5V or less) LEDs up to high-voltage (ex: 36V or more) LEDs. Furthermore, the current driver system 100 is operable to drive LEDs with a pulsed control signal without being affected by the higher capacitance of larger LEDs.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A system for driving one or more electrical elements, the system comprising:
    a current driver operable to cause current to flow to the one or more driven electrical elements;
    a sensor module for sensing a current at the input of the current driver;

a compensation module for compensating an input control signal based on the sensed current at the input of the current driver;

an optocoupling module having a grounded side connected to an earth ground and a floating side connected to a floating ground, the grounded side receiving the compensated control signal and the floating side outputting a floating control signal corresponding to the compensated control signal;

an amplification module connected to the floating ground and operable for amplifying the floating control signal outputted from the optocoupling module, the amplified floating control signal further controlling the current driver to cause the flow of current to the driven electrical elements.

2. The system of claim 1, wherein the amplification module is located within a floating subsystem of the system; the system further comprising:

a voltage converter having an output side connected to the floating ground operable for supplying power to the amplification module within the floating subsystem.

3. The system of claim 2, wherein the floating ground corresponds to the voltage at an anode of the one or more driven electrical elements.

4. The system of claim 1, wherein the sensor module and the compensation module are located within a grounded subsystem of the system; and wherein each of the sensor module and the compensation module are connected to the earth ground.

5. The system of claim 1, wherein the optocoupling module provides an interface between a grounded subsystem and a floating subsystem of the system.

6. The system of claim 5, wherein the optocoupling module electrically decouples the grounded subsystem from the floating subsystem.

7. The system of claim 6, wherein the optocoupling module preserves the bandwidth of a compensation loop formed between the current driver being in the floating subsystem and the compensation module being in the grounded subsystem.

8. The system of claim 1, wherein the one or more driven electrical elements are operated from the voltage difference between the floating ground and the earth ground.

9. The system of claim 1, further comprising a voltage to current to voltage converter operable for converting the input control signal to a current control signal back to a voltage control signal, the compensation module receiving the converted voltage control signal.

10. The system of claim 1, further comprising a temperature-sensitive DC voltage biasing module operable for DC biasing a voltage supply of the amplification module.

11. The system of claim 1, wherein the driven electrical elements are one or more light emitting devices.

12. The system of claim 11, wherein the one or more light emitting devices are a plurality of light emitting diodes.

13. A stroboscopic lighting apparatus comprising the system according to claim 12.

14. A camera apparatus comprising the system according to claim 12.

15. The system of claim 1, wherein the amplification module is located within a floating subsystem of the system; the system further comprising:

a voltage converter having an output side connected to the floating ground operable for supplying power to the amplification module within the floating subsystem;

a voltage to current to voltage converter operable for converting the input control signal to a current control signal back to a voltage control signal, the compensation module receiving the converted voltage control signal;

a temperature-sensitive DC voltage biasing module operable for DC biasing a voltage supply of the amplification module; and wherein the floating ground corresponds to the voltage at the anode of the one or more driven electrical elements;

wherein the sensor module and the compensation module are located within a grounded subsystem of the system;

wherein each of the sensor module and the compensation module are connected to the earth ground;

wherein the optocoupling module electrically decouples the grounded subsystem from the floating subsystem and preserves the bandwidth of a compensation loop between the current driver being in the floating subsystem and the compensation module being in the grounded subsystem;

wherein the one or driven electrical elements are operated from the voltage difference between the floating ground and the earth ground; and wherein the driven electrical elements are a plurality of light emitting diodes.

16. A current driving system, the system comprising:

a plurality of light emitting diodes connected in parallel;

a current driver operable to cause current to flow to the plurality of light-emitting diodes;

a sensor module for sensing a current at the input of the current driver;

a compensation module for compensating an input control signal based on the sensed current at the input of the current driver;

an optocoupling module having a grounded side connected to an earth ground and a floating side connected to a floating ground, the grounded side receiving the compensated control signal and the floating side outputting a floating control signal corresponding to the compensated control signal, the floating control signal further controlling the current driver to cause the flow of current to the plurality of light-emitting diodes.

17. The system of claim 16, wherein the floating ground corresponds to the voltage at an anode of the plurality of light-emitting diodes.

18. The system of claim 16, further comprising a grounded subsystem having the earth ground and a floating subsystem having the floating ground;

wherein the floating ground corresponds to the voltage at an anode of the plurality of light-emitting diodes; and wherein each of the sensor module and the compensation module are connected to the earth ground.

19. The system of claim 18, wherein the optocoupling module electrically decouples the grounded subsystem from the floating subsystem.

20. The system of claim 19, wherein the plurality of light-emitting diodes are operated from the voltage difference between the floating ground and the earth ground.

* * * * *